Oct. 7, 1924.  
M. S. RAMSEY  
LAWN MOWER  
Filed June 27, 1921  
1,511,040  
3 Sheets-Sheet 3

Inventor  
Mark S. Ramsey

By Whittemore Hulbert Whittemore  
& Belknap  
Attorneys

Patented Oct. 7, 1924.

1,511,040

UNITED STATES PATENT OFFICE.

MARK S. RAMSEY, OF DETROIT, MICHIGAN, ASSIGNOR TO MOTO-MOWER COMPANY, OF DETROIT, MICHIGAN, A CORPORATION OF MICHIGAN.

LAWN MOWER.

Application filed June 27, 1921. Serial No. 480,642.

*To all whom it may concern:*

Be it known that I, MARK S. RAMSEY, a citizen of the United States of America, residing at Detroit, in the county of Wayne and State of Michigan, have invented certain new and useful Improvements in Lawn Mowers, of which the following is a specification, reference being had therein to the accompanying drawings.

The invention relates to lawn mowers and has for one of its objects the provision of a construction which can be readily propelled and guided manually and in which the power required for operating the cutter is derived from a motor. Another object is the provision of a construction in which the motive power can be used to propel the lawn mower and can be applied to either or both of the ground wheels. A further object is to provide a handle for the lawn mower capable of being folded to make the lawn mower more compact in shipping. Still further objects of the invention are to provide a novel form of mechanism for mounting the bed knife or cutter bar and for adjusting the same; and to provide anti-friction bearings for the knife reel which are adjustable to take up wear. With these and other objects in view, the invention resides in the novel features of construction and combinations and arrangements of parts as more fully hereinafter set forth.

In the drawings:

Figure 5 is a cross section through one end of the lawn mower, particularly showing the anti-friction bearing for the knife reel;

1 is the revoluble knife reel preferably having the spirally arranged cutting blades 2, and 3 is the stationary cooperating bed knife or cutter bar. These parts are mounted upon a light frame preferably comprising side plates 4 and cross bars 5. 6 are ground wheels at the outer sides of the side plates 4, and 7 is a roller adjustably mounted at the rear of the side plates.

Figure 6:
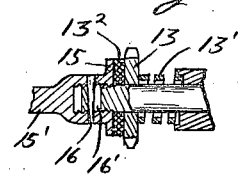
Figure 6 is a detail view.

8 is a motor preferably of the two-cycle internal explosion engine type which is mounted upon the base plate 9 in turn secured to the cross bars 5. The crank shaft 10 of this motor is provided with a suitable driving connection to the shaft 11 of the knife reel, such as the chain 12 engaging the sprockets 13 and 14 respectively upon the crank shaft and knife reel shaft. As shown particularly in Figure 6, the sprocket wheel 13 is rotatably mounted upon the crank shaft 10 and is frictionally held from rotation relative thereto by means of the coil spring 13' yieldably forcing the sprocket wheel against the washer 13² fixedly secured to the crank shaft and preferably formed of asbestos or the like. This washer abuts the nut 15 threaded upon the end of the shaft and formed with a suitable jaw 15' for engagement with a starting crank. For holding the nut from rotation there is a pin 16 adapted to extend through one of a number of transverse holes in the nut and the transverse slot 16' in the shaft, which permits of adjustment of the nut upon the shaft.

Figure 1:
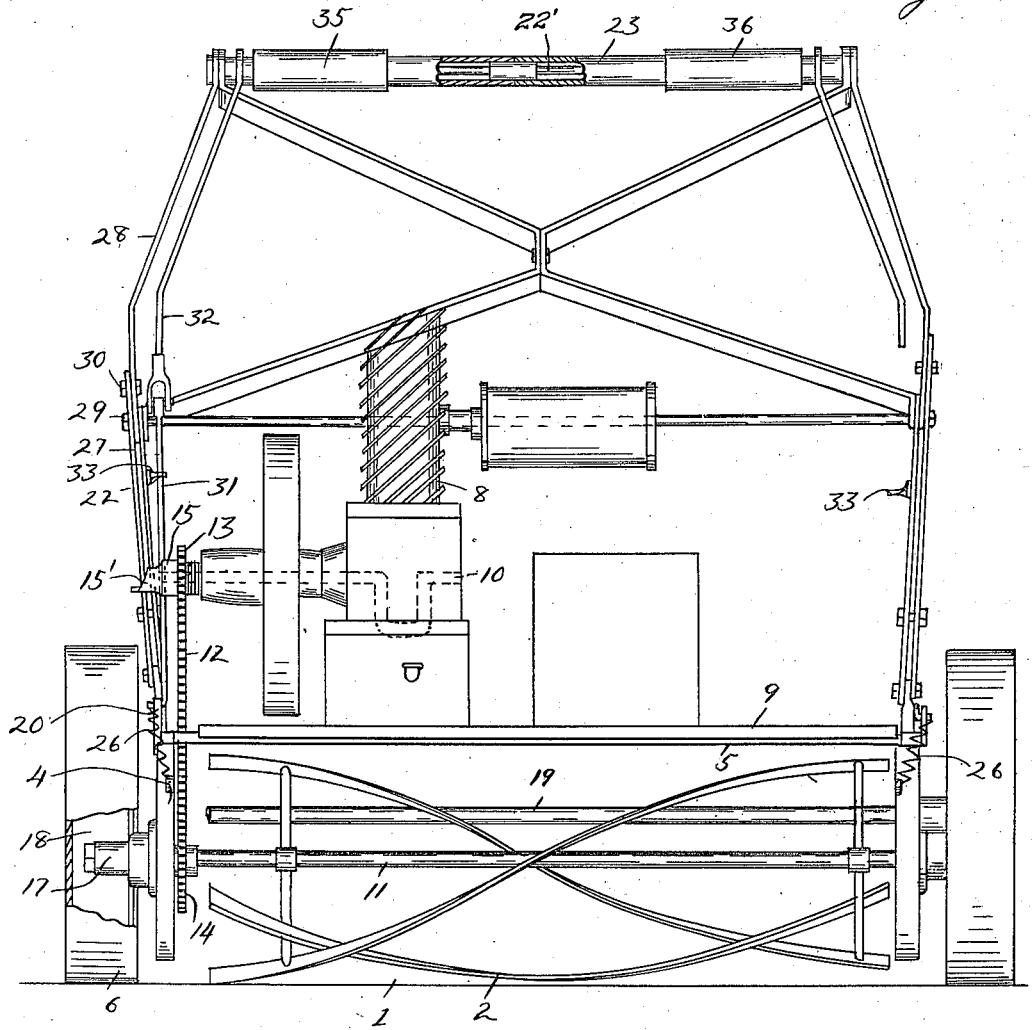
Figure 1 is a front elevation with parts broken away, of a lawn mower embodying my invention.
Figure 2:
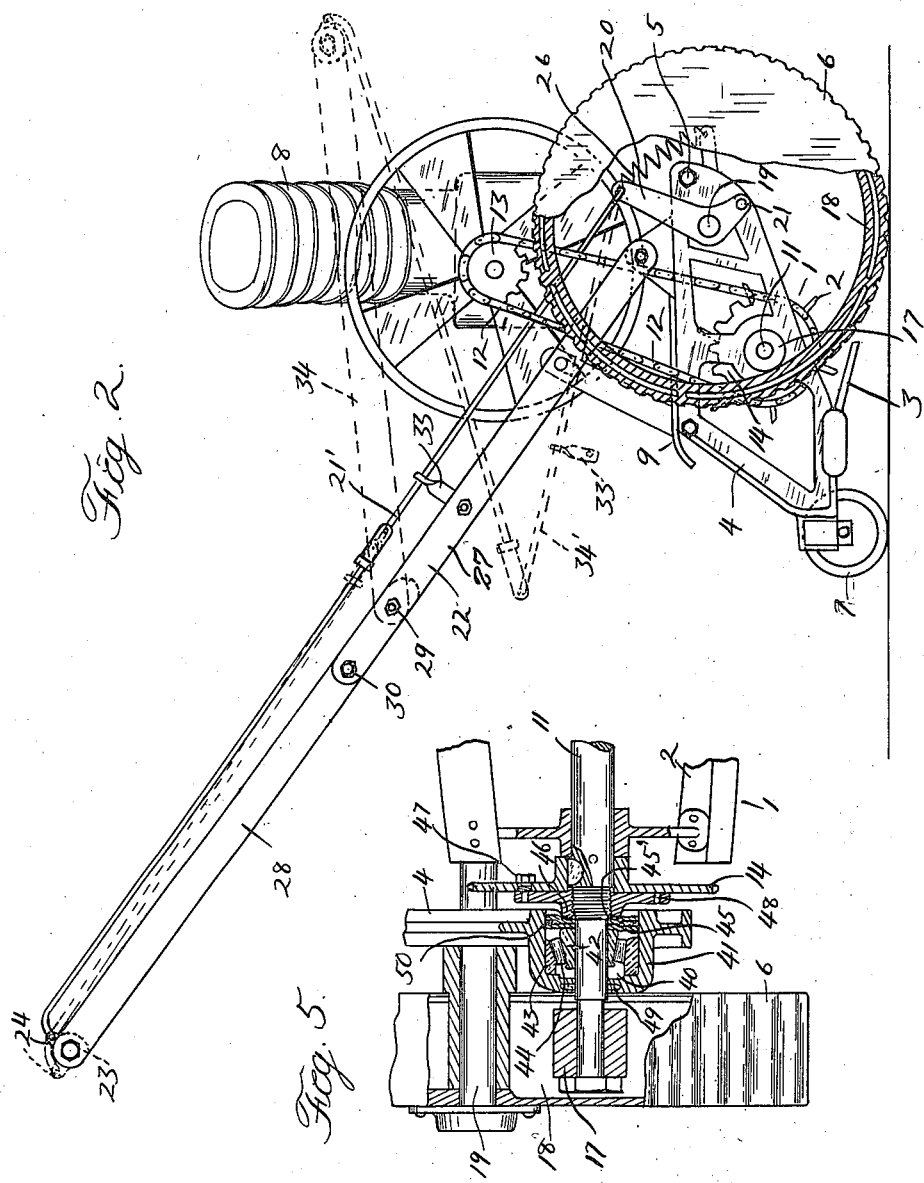
Figure 2 is a side elevation thereof with parts broken away.
Figure 3:
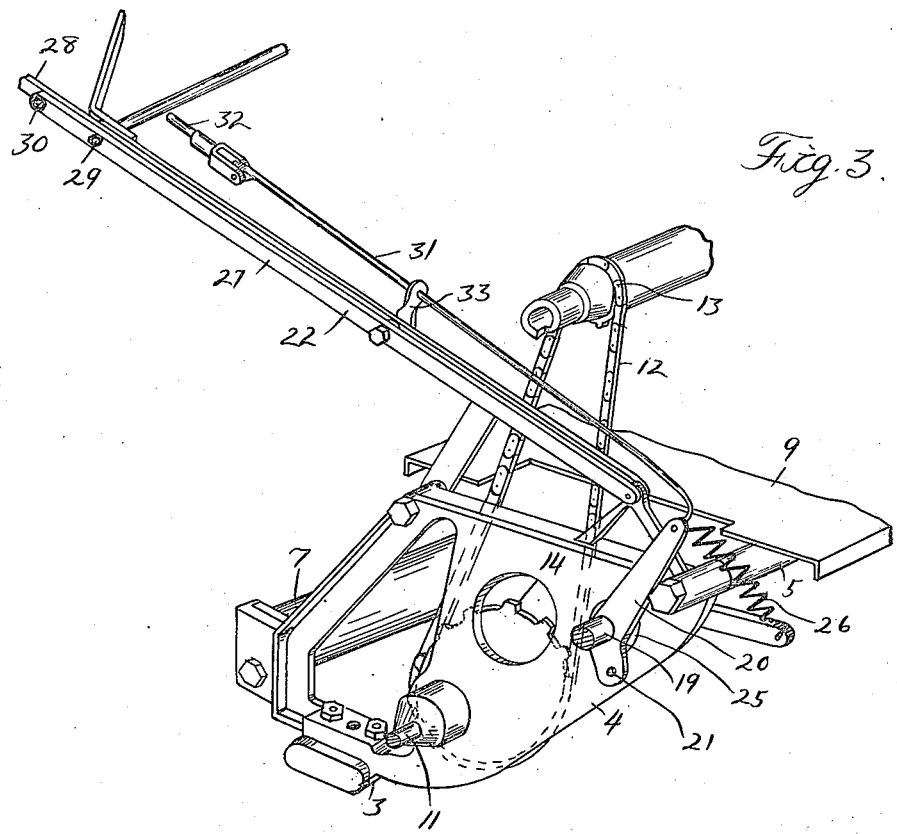
Figure 3 is a perspective view of a portion thereof with a ground wheel removed.

For propelling the lawn mower from the motor, there are the friction pulleys 17 fixedly mounted upon the ends of the knife reel shaft 11 and which are adapted to engage the inner faces of the peripheral flanges 18 upon the ground wheels 6. To permit of this engagement, the ground wheels are preferably journalled upon the shaft 19 which is mounted upon the rock arms 20 pivoted at 21 upon the side plates 4 and adapted to be actuated by the rods 21' mounted upon the handle. This handle comprises the side bars 22 which are connected at their inner ends to the side plates 4 of the frame and also the handle bar 23 surrounding a rod 22' extending between the outer ends of the side bars. The outer ends of the rods 21' are pivotally connected to lugs 24 upon the handle bar and the latter is revoluble to longitudinally move the rods 21' to rock the rock arms 20 and thereby swing the ground wheels 6 into or out of engagement with the pulley wheels 17. The shaft 19 for the ground wheels extends through the elongated apertures 25 in each of the side plates 4 thereby permitting of the swinging of the ground wheels. 26 are coil springs connected to the side plates 4 and to the ends of the rock arms 20 adjacent to the rods 21' for yieldably moving the ground wheels 6 in a direction to engage their peripheral flanges with the pulley wheels when the rods 21' are in their forward positions of adjustment; but upon movement of the rods 21' to their rearward positions as indicated by the dotted lines in Figure 2, the coil springs are placed under tension and the ground wheels are withdrawn from engagement with the pulley wheels. The rods 21' are held in their rearward position due to the fact that their outer ends are off-center but are limited from further movement by engaging the handle bar 23.

To facilitate shipment of the lawn mover, each of the side bars 22 comprises the inner and outer bars 27 and 28 respectively which are pivoted to each other at 29 and are held in alignment by the bolt 30. Each of the control rods 21' also comprises the inner and outer rods 31 and 32 respectively which are pivotally secured to each other, and the inner rod of which is slidably mounted in the strap 33 removably secured to the inner bar 27. By removing the bolts 30 and disconnecting the straps 33 from the inner bars 27, the handle can be folded so that the outer side bars 28 can occupy the position shown by the dash line 34 in Figure 2 in which position the inner rods 31 of the control rods occupy the position shown by the dash line 34'.

In order to readily guide the lawn mower and at the same time drive the same by its motor, the handle bar 23 is divided intermediate its ends to form the bars 35 and 36 which are rotatable independently of each other so that either or both of the ground wheels 6 may be placed in frictional contact with its respective pulley wheels 17.

Figure 4:
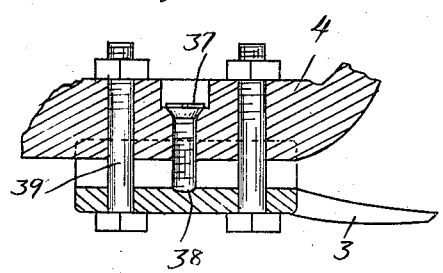
Figure 4 is a cross section through the mounting for the bed knife or cutter bar.

To provide a simple and efficient mounting for the bed knife or cutter bar 3 which will permit of its being readily adjusted, there is as shown particularly in Figure 4 the screw 37 threadedly engaging the side plate 4 and having the semi-spherical lower end 38 which engages in a correspondingly shaped recess in each end of the cutter bar. Bolts 39 extend through the side plate and cutter bar at opposite sides of the screw 37 for adjusting the cutter bar and maintaining the same in its adjusted positions.

The knife reel shaft 11, shown particularly in Figure 5, is mounted at each end in the anti-friction bearing 40 within the enlarged cup-shaped portion 41 of the side plate 4. This bearing comprises the inner and outer race members 42 and 43 respectively having conical faces for engagement with the conical rollers 44. 45 are bearing washers at the outer end of the inner race member 42, and 45' is a shoulder upon the shaft 11 adjacent to the outer bearing washer. For limiting end play of the shaft and taking up lost motion in the bearings, there is the collar 46 threadedly engaging the shaft at one end and adapted to abut the adjacent outer bearing washer to adjust the inner race member 42 outwardly relative to the shaft. The collar 46 is held in its position of rotative adjustment upon the shaft 11 by suitable means such as the bolt 47 threadedly engaging the sprocket wheel 14 and extending into one of a series of apertures 48 in the collar. Suitable packings 49 and 50 are provided between the shaft 11 and the cup-shaped portion 41 and between the bearing washers 45 and the cup-shaped portion 41 for retaining the lubricant and keeping dust and dirt out of the bearings.

What I claim as my invention is:

1. A lawn mower comprising a frame, a rotary cutter upon said frame, a motor mounted upon said frame for driving said cutter, ground wheels at opposite sides of said frame, a foldable handle comprising inner and outer side bars connected to said frame and pivotally connected to each other, means for detachably securing said inner and outer side bars in substantial alignment with each other, and a foldable member mounted upon said handle for controlling the driving of said ground wheels from said motor, said member comprising inner and outer rods pivotally connected to each other.

2. A lawn mower comprising a frame, a rotary cutter upon said frame, a motor mounted upon said frame for driving said cutter, ground wheels on opposite sides of said frame, a foldable handle comprising pivoted inner and outer side bars connected to said frame, removable means for detachably securing said inner and outer side bars in substantial alignment with each other, and a handle bar, a guide removably mounted upon said inner side bar, and a foldable member mounted upon said handle for controlling the driving of said ground wheels from said motor, said member comprising pivoted inner and outer rods, said inner rod slidably engaging said guide, and said outer rod connecting said handle bar, said handle and controlling member being foldable upon removing said means for securing the inner and outer side bars in substantial alignment with each other and said guide.

3. A lawn mower comprising a frame, a rotary cutter upon said frame, a motor upon said frame for driving said cutter, rock arms swingingly mounted on said frame, a shaft carried by said rock arms, ground wheels mounted on the shaft at opposite sides of said frame, a foldable handle comprising inner and outer side bars connected to said frame and pivotally connected to each other, headed elements securing said inner and outer side bars in substantial alignment with each other, and a foldable member mounted upon said handle and connected to one of said rock arms for controlling the driving of said ground wheels from said motor.

4. In a lawn mower, the combination with a frame, a motor mounted on said frame, rotatable drive members carried by said frame, a driving connection between said members and motor, rock arms swingingly mounted on said frame, ground engaging wheels carried by said rock arms, and means for swinging said wheels into engagement with said rotatable members to be driven thereby, said means including a foldable member and a foldable handle connected to the frame, said foldable handle comprising inner and outer pivotally connected side bars, a rod connecting said outer side bars, and a sectional handle bar rotatably mounted on said rod, said foldable member comprising inner and outer pivotally connected rods secured respectively to said rock arms and the sections of said rotatable handle bar.

In testimony whereof I affix my signature.

MARK S. RAMSEY.